United States Patent [19]
Palmer

[11] 3,902,116
[45] Aug. 26, 1975

[54] QUADRATURE ELECTRONIC TACHOMETER

[75] Inventor: Ronald S. Palmer, San Jose, Calif.

[73] Assignee: International Business Machines Corporation, Armonk, N.Y.

[22] Filed: Apr. 10, 1974

[21] Appl. No.: 459,762

[52] U.S. Cl. .............................. 324/175; 328/158
[51] Int. Cl.² ..................... G01P 3/36; G06G 7/00
[58] Field of Search .......... 324/175, 176, 163, 166, 324/165; 328/61, 135, 158, 166; 235/189

[56] References Cited
UNITED STATES PATENTS

| | | | |
|---|---|---|---|
| 3,406,336 | 10/1968 | McCampbell et al. | 324/176 |
| 3,579,268 | 5/1971 | Steiger | 328/166 X |
| 3,710,265 | 1/1973 | Gray | 324/165 X |
| 3,813,597 | 4/1974 | Le Vitt | 324/176 |

Primary Examiner—Alfred E. Smith
Assistant Examiner—Rolf Hille
Attorney, Agent, or Firm—Nathan N. Kallman

[57] ABSTRACT

An electronic tachometer is disclosed for generating a continuous velocity output signal from the combination of two quadrature signals, each having the same frequency but being 90° out of phase with each other. The tachometer comprises AGC generating means for generating an automatic gain control signal from the two quadrature signals, means for generating basic timing signals for the electronic tachometer from the two quadrature signals, means for generating a plurality of velocity signals from the two quadrature signals and for generating signals indicative of the relative magnitude of selective ones of said generated velocity signals and finally, selection and combination means for selecting from the plurality of generated velocity signals those segments of the generated velocity signals which are the most accurate indications of the velocity at any given instant in time by using the signals indicative of the relative size of the selected ones of said velocity signals and the basic timing signals from the timing means. The resulting output velocity is extremely accurate even at low velocities which would have otherwise been most susceptible to error. This electronic tachometer is expressly designed to present a zero output velocity signal when in fact the velocity of the moving member being measured is zero.

17 Claims, 8 Drawing Figures

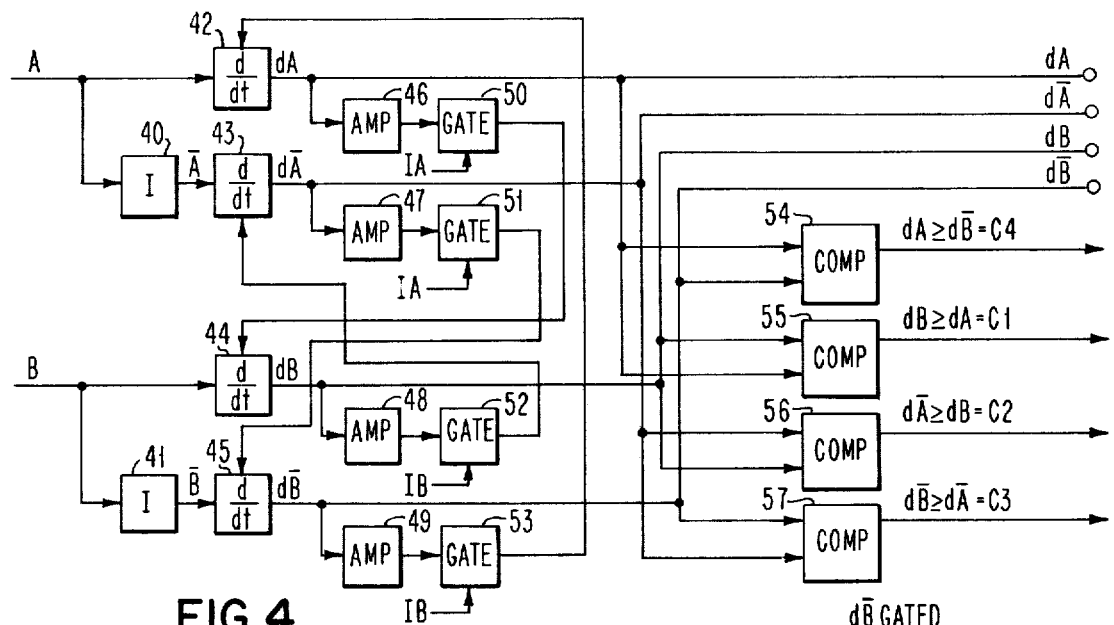
FIG.4
FIG.5
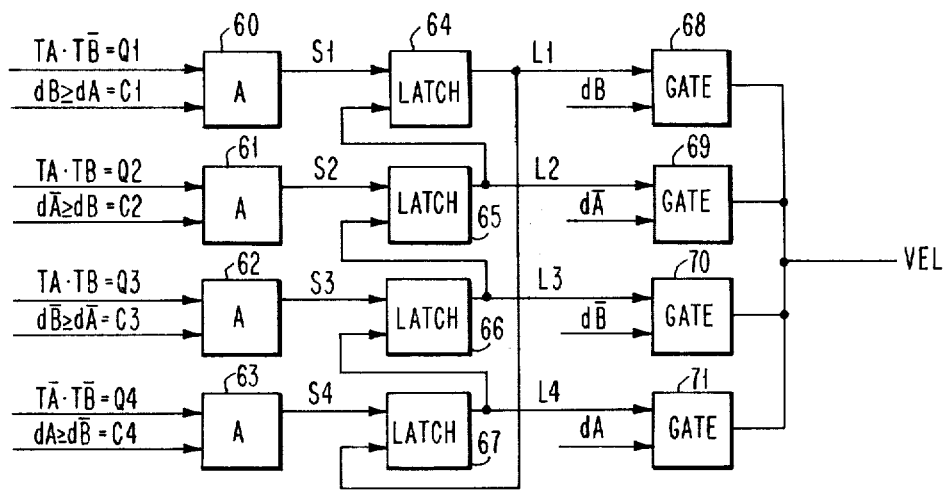
FIG.6
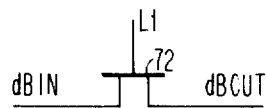
FIG.7

QUADRATURE ELECTRONIC TACHOMETER

BACKGROUND OF THE INVENTION

1. Field of the Invention

This invention relates to an electronic tachometer, and more particularly, to an electronic tachometer that generates an output velocity signal from two quadrature signals which are of the same frequency but 90° out of phase with each other.

2. Description of the Prior Art

Electronic tachometers which generate a continuous output signal indicative of the velocity of an object, where the output velocity signal is generated from the processing and combination of two input signals, is well-known within the art. In these electronic tachometers, the processing of the input signal is dependent upon what the input signals represent, this is to say, whether the input signals represent position, acceleration, or velocity of the object whose velocity is being measured by the electronic tachometer. One major disadvantage of most electronic tachometers is that they become inaccurate at slow velocities due to the introduction of a DC offset which is introduced due to circuit components within the electronic tachometer. Another difficulty often incurred within electronic tachometers which generate an output signal which is made up from selective portions of a plurality of process signals is that at the time of switching from one signal to another there may exist differences between the two signals. This unequality of the two signals introduces undesirable deviations in the output velocity signal and therefore detracts from the accuracy of the electronic tachometer.

It is therefore an object of this invention to provide an electronic tachometer which produces an output velocity signal which has no DC offset component present.

Another object of this invention is to provide component velocity signals to form a continuous output velocity signal where the switching time between the component velocity signals is automatically controlled such that the two signals are not switched unless the two signals are equal in value.

Another object of this invention is to provide an electronic tachometer wherein the input signals used to generate the timing and the component velocity signals are two quadrature signals 90° out of phase with each other.

Another object of the invention is to provide an electronic tachometer which derives an AGC control for controlling the source of the two quadrature input signals by deriving an AGC control signal from the two quadrature input signals.

Still another object of the invention is to provide an electronic tachometer which incorporates a compensating means for increasing the response time of the differentiators used to generate the velocity signals.

SUMMARY OF THE INVENTION

This invention relates to an electronic tachometer for generating a continuous output velocity signal from two input quadrature signals which are 90° out of phase with each other. The electronic tachometer comprises AGC control means for generating an AGC signal from the two input quadrature signals. The AGC circuitry further comprises waveshaping means for generating two signal components which when added together will provide an indication of the variations in gain of the input quadrature signals. The electronic tachometer also contains timing means for generating all the necessary timing for the generation of the continuous output velocity signal. Further, processing circuitry is provided for generating four velocity signals and four comparative signals. The four comparative signals are indicative of the relative magnitude comparison of selected ones of the four generated velocity signals. The process means further includes compensating means for increasing the effective speed of the differentiators such that an accurate velocity signal is generated at high velocities. Finally, the tachometer includes combination means for selectively extracting portions of each of the four generated velocity signals and combining those selected portions to generate a continuous output velocity signal that is indicative of the velocity of the object being measured. This tachometer has the characteristic of having no DC offset component within the velocity signal such that at zero velocity, the output velocity signal generated by the tachometer is also zero. Further, the combination means also includes circuitry for controlling the switching between the selective portions of the various velocity signals such that switching will only occur between two selected portions when those two portions are equal to each other.

BRIEF DESCRIPTION OF THE DRAWINGS

The foregoing and other objects, features and advantages of the invention will be apparent from the following, more particular description of the preferred embodiment, as illustrated in the accompanying drawings, in which:

FIG. 4 is a logic diagram of the processing means for generating the four velocity signals and for generating four comparison signals indicative of the relative magnitude of selected ones of said generated velocity signals.

FIG. 5 is a schemmatic diagram of the differentiators used in FIG. 4 and demonstrates the point at which the compensation is inputted into the differentiator by the compensating means of FIG. 4.

FIG. 6 is a logic diagram of the selection and combination means which select portions of the four velocity signals generated by FIG. 5 in conjunction with the magnitude comparison signals of FIG. 5 and timing signals of FIG. 3.

FIG. 7 is a circuit diagram of the gate circuits as shown in FIG. 6.

DESCRIPTION OF THE PREFERRED EMBODIMENT

Figure 1:
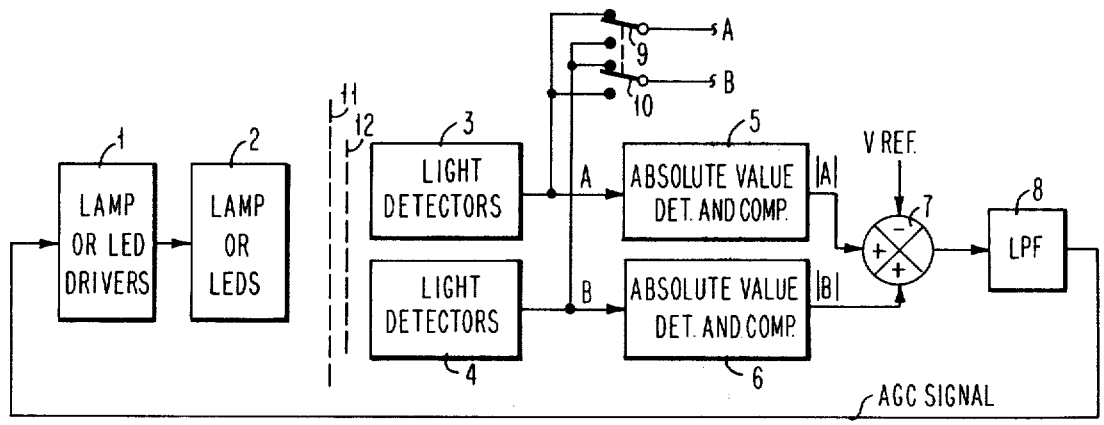
FIG. 1 is a logic diagram which shows the means for generating the two quadrature signals and the AGC means for generating an AGC control signal from the generated to quadrature signals.

The preferred embodiment of the electronic tachometer is taught within the environment of an optical system which generates the two input signals which are 90° space quadrature with each other. With reference to FIG. 1, the light source 2 may be either a lamp or light emitting diodes (LED's) driven by a driver 1. Ino optical gradients 11 and 12 are used, optical grating 11 is fixed and optical grating 12 is moved by the object whose velocity is to be measured. Light detectors 3 and 4 are placed such that they are effectively 90° out of phase with each other with respect to the modulated light signal being generated by the interaction of optical grating 12 with fixed optical grating 11. The use of optical grating to generate two quadrature signals 90° out of phase for the purpose of positioning and the relationship between the graduations on the optical gratings to the positioning system are taught and are well known in the art. The positioning aspect of such a system is not part of this invention and will therefore not be discussed any further except to the extent that two quadrature signals 90° out of phase are generated.

Figure 8:
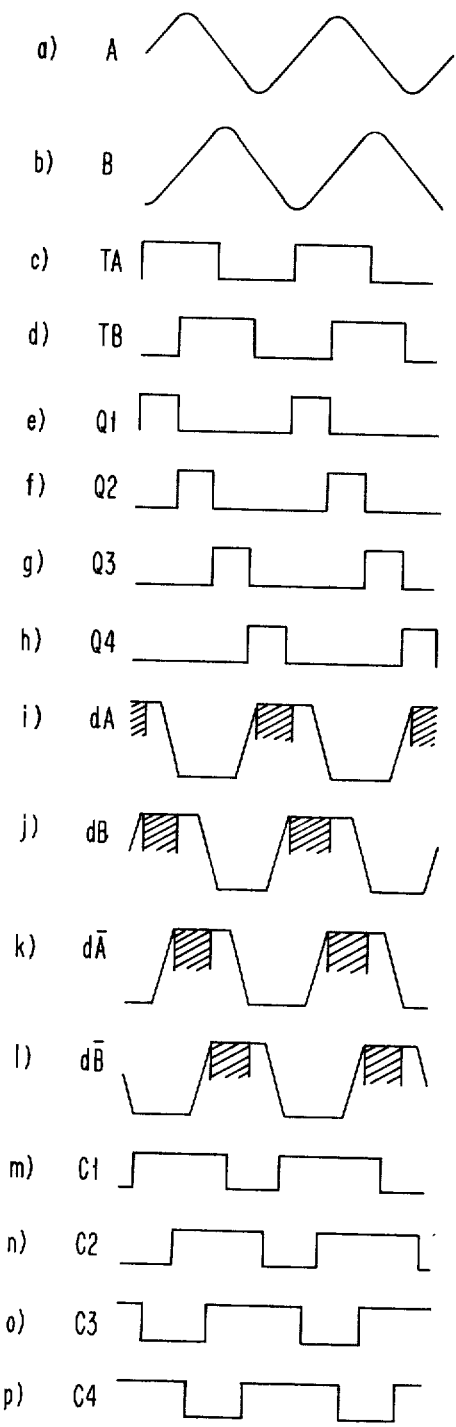
FIG. 8 is a series of waveforms shown in time relationship indicative of different waveshapes throughout the electronic tachometer.
Figure 8:
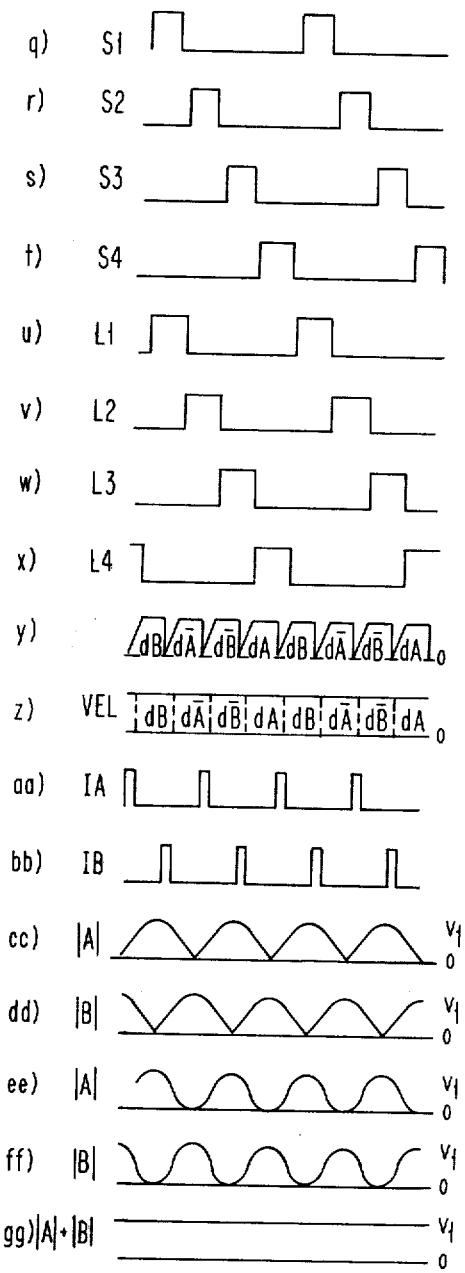

FIG. 8 waveforms $a$ and $b$ show the output A and B of light detectors 3 and 4 respectively. Waveform $cc$ shows the output $|A|$ of absolute value detectors having as its input waveform $a$. In similar manner, waveform $dd$ shows the output $|B|$ of absolute value detector $b$ having the output of light detector 4 or waveform $b$ as an input. It is desired to have the two absolute waveforms be 180° out of phase with each other and symmetrical such that the addition of the two waveforms will always equal a constant value. As can be seen from waveforms $cc$ and $dd$, the resulting waveforms, although 180° out of phase, are not symmetrical.

Figure 2:
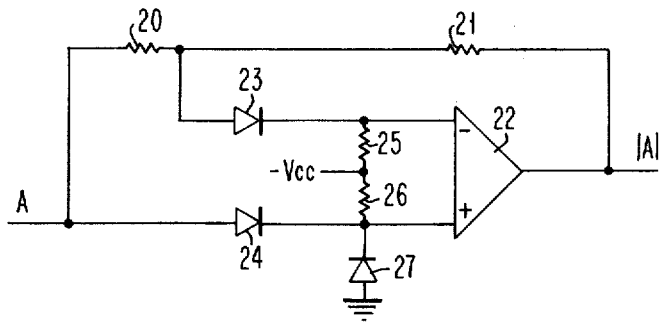
FIG. 2 is a schematic diagram of the absolute value detector and compensator of FIG. 1.

To compensate for the non-symmetry of the resulting waveforms, an absolute value detector having compensating means for generating a symmetrical signal is shown in FIG. 2. When the input signal is positive, diode 24 is forward biased and operational amplifier 22 acts as a voltage follower. The amplifier 22 has high input impedance so a trickle bias current for both diodes 23 and 24 is supplied by resistors R25 and 26 respectively through the bias voltage $-\text{V}cc$. When the input signal becomes negative, diode 24 cuts off and diode 27 clamps the positive input of operational amplifier 22 at one diode voltage drop below ground. The amplifier 22 then operates as an inverter through resistors R20 and 21. Diodes D23 and D24 have a non-linear response at low input voltages. The non-linearity of the diodes are selected to match the non-linearities about the positive peaks of waveforms $cc$ and $dd$ such that the same non-linearities will be introduced about the zero voltage value of waveform $cc$ and $dd$.

This can be seen by viewing FIG. 8 waveforms $ee$ and $ff$. As can be seen, the two waveforms are now 180° out of phase and in symmetry. The summation of the two waveforms $ee$ and $ff$ when added together generate wavefrom $gg$ having a constant value.

It can be realized that the summation of these two waveforms will always be the same except if a variation in the light intensity should occur which would affect the magnitude of the voltage being generated by either light detectors 3 or 4. Therefore, the system is designed about a nominal light intensity which generates a known value for the summation of waveforms $ee$ and $ff$ yielding waveforms $gg$. A reference voltage is thereby added to waveform $gg$ which is of a value equal to and opposite the desired predicted magnitude of waveform $gg$. If any variation in light intensity should occur, the output from summer 7 will have a magnitude and sign indicative of its direction and magnitude of the variation of the lamp intensity from lamps 2. This signal from summer 7 is filtered by low-pass filter 8 to damp the system's response to transient signals. The output of low pass filter 8 is an AGC control signal which is fed back to the lamp drivers 1 for changing the intensity of the lamps 2 such that the output of summer 7 will have a value of zero.

While this specific embodiment was taught with regard to an optical system, it is directly applicable to magnetic systems where two transducers would generate quadrature signals, 90° out of phase with each other, and where the AGC signal would be fed back into an AGC amplifier which would compensate for the variations in the amplitude of the generated signals from the transducers.

Figure 3:
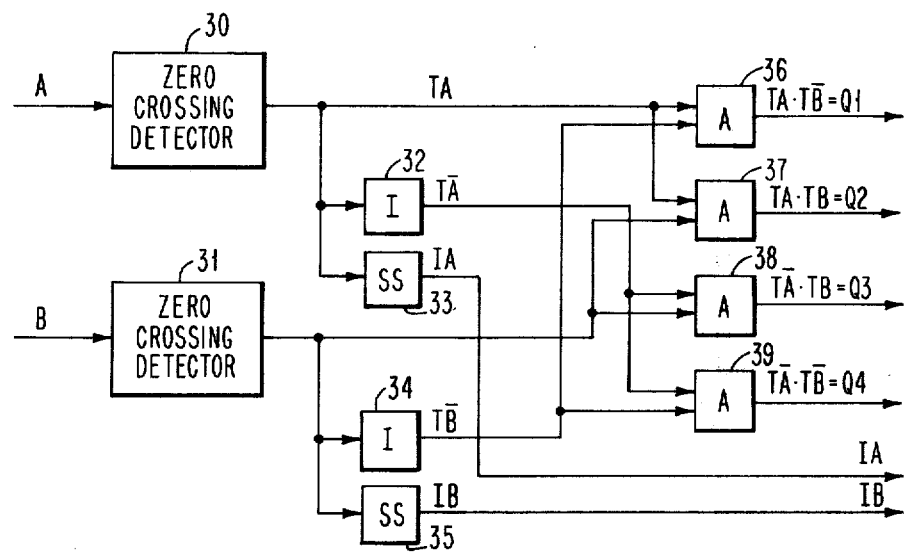
FIG. 3 is a logic diagram of the timing means which generate all of the necessary timing from the two generated quadrature input signals of FIG. 1.

The timing means for generating the necessary timing signals used within the electronic tachometer is shown in FIG. 3. Zero crossing detector 30 generates output signal TA, waveform $c$ of FIG. 8. Zero crossing detector also acts as an input to inverter 32 for the purpose of generating an output signal T̄A which is 180° out of phase with output signal T̄A. Zero crossing detector 30 also acts as an input to single shot 33 which generates an output whenever zero crossing detector 30 changes state. The output IA from single shot 33 is shown as waveform $aa$ in FIG. 8.

Quadrature signal B is the input to zero crossing detector 31 which generates output signal TB, waveform $d$ in FIG. 8. Output signal TB is 90° out of phase with output signal TA from zero crossing detector 30. The output of zero crossing detector 31 is also inverted by inverter 34 to generate an output signal T̄B which is 180° out of phase with output signal TB. Zero crossing detector 31 acts as an input to single shot 35 for generating output signal IB which is a pulse of short duration for each time zero crossing detector 31 changes state. The output IB is shown as waveform $bb$ in FIG. 8.

Output signals TA, T̄A, TB and T̄B are inputs to AND circuits 36, 37, 38 and 39 for generating four quadrature timing signals Q1, Q2, Q3, and Q4, which are shown as waveforms $e$–$h$ respectively in FIG. 8. Each quadrature signal represents a unique 90° within the 360° of the quadrature input signals A and B.

The processing means for generating four velocity signals and four comparision signals is shown in FIG. 4. Input quadrature signal A is fed into differentiator 42 for producing output signal dA as represented by waveform $i$ in FIG. 8. Input quadrature signal A is also inverted by inverter 40 to produce signal Ā which is differentiated by differentiator 43 for producing output velocity signal dĀ, which is represented by waveform $d$ of FIG. 8. Input quadrature signal B is in similar manner inputted to differentiator 44 and to differentiator 45 via inverter 41 for generating output velocity signals dB and dB̄ as represented by waveforms $j$ and $l$ respectively of FIG. 8.

FIG. 5 is a circuit diagram of a common differentiator which is used as differentiators 42 through 45. It basically consists of capacitor 58 and resistor 59. Whenever a rate of change is being inputted to the differentiator current will flow through resistor 59 to charge capacitor 58. Therefore, the rate or change or slope of the input signal determines how much current is flowing through resistor 59. When the velocity is equal to zero such that there is no change in slope in the input signal to the differentiator, capacitor 58 will remain charged and the voltage drop across resistor 59 will be zero. Therefore, there is no DC component in the output of the differentiator since no current is flowing through resistor 59, this thereby presents a true zero output voltage indicator for a zero velocity condition.

When a differentiator is to be used with an input signal which can have a wide range of frequencies such as is the case in an electronic tachometer, the normal procedure is to design the differentiator such that it will differentiate in a true fashion the highest frequency that is expected to be inputted into the electronic tachometer as an input signal. However, in designing a differentiator to follow the highest frequency, there is inherently a loss of gain in the output signal. It is therefore desired to be able to differentiate properly the high frequency component while not suffering the inherent loss of gain that would normally be incurred.

Therefore, the differentiators used within this tachometer were designed to truly differentiate the frequencies up to the middle of the expected frequency range. The four differentiators are generating output signals all indicative of the same input velocity being sensed by the electronic tachometer. The difference between the four velocity signals only resides in their phase relationship to each other. It is this fact that allows the output of the differentiators to be used to compensate for each other's inability to follow high frequencies. The concept is based on the fact that at any given instant of time, one differentiator 4 has a signal that is indicative of the true velocity of the system being measured. If that output signal is therefore fed as a compensating signal to the differentiator that is generating an output signal which is 90° lagging in phase from the signal with the true velocity, then the true velocity signal may be used as a substitute output for the differentiator until that differentiator reaches the true velocity state. This is accomplished by first buffering each of the four differentiators by amplifiers 46–49. The buffered outputs of the differentiators are then gated through gates 50–53. Gates 50 and 51 are controlled by the output signal IA of single shot 33. In a similar manner, the gates 52 and 53 are controlled by the output signal IB from single shot 35.

To better understand this operation, attention is drawn to FIG. 8 waveforms *aa* and *bb* which show the timing signals IA and IB. The output of differentiators 42–45 are shown as waveforms *i–l* of FIG. 8. Some liberty has been taken in drawing these waveforms to simplify the understanding in the discussion of the compensation. The pulse width of the pulses in the outputs IA and IB of single shots 33 and 35 are equal to approximately 10 time constants of the differentiator at the highest frequency expected by the system. It can be seen that output dB, waveform *j* of FIG. 8, takes a period of time to reach a true indication of the velocity. However, at the same period of time, velocity signal dA (waveform 1 of FIG. 8) has the correct velocity value. Therefore, timing signal IA (waveform *aa* of FIG. 8) is used to gate velocity signal dA to the output of differentiator 44 such that the effective output of differentiator 44 will appear as the output of dA for a period of time that gate 50 is conditioned by control signal IA and then will follow the velocity signal dB. Such an arrangement for each of the differentiators is shown in FIG. 4 and acts the exact same way as described for modifying velocity signal dB by velocity signal dA. This effectively increases the rise time of the differentiator to the system and allows the system to react to the high frequency component as well as the low frequency components of the possible frequency spectrum expected to be processed by the electronic tachometer.

For future discussion, let it be assumed that output velocity signals dA, dB, dA̅ and dB̅ (waveforms *i–l* of FIG. 8) are the resulting waveforms after the correction as previously described. Due to circuit delays, it is impossible to eliminate the total effect of rise time although it may be greatly minimized by the previous compensation means as heretofore described.

Comparator 54 compares velocity signals dA and dB̅ and produces an output signal C4 whenever dA is equal to or greater than dB̅. In similar manner, comparator 55 generates an output signal C1 whenever dB is equal to or greater than dA, comparator 56 generates output signal C2 whenever dA̅ is equal to or greater than dB̅ and finally, comparator 57 generates output signal C3 whenever dB̅ is equal to or greater than dA̅. The resulting waveforms C1–C4 are shown as waveforms *n–p* respectively of FIG. 8.

The selection and combination means are shown in FIG. 6. It is desired to select portions of velocity signals dA, dB, dA̅ and dB̅ at specific times and to combine those portions to form an output velocity signal that is a true indication of the velocity of the object being measured. If quadrature signal Q1 was used to gate velocity signals dB, it can be seen from the timing chart of FIG. 8 that the portion that would be gated by quadrature signal Q1 would include the rise time portion of velocity signal dB. Quadrature signal Q2 is associated with velocity signal dA̅, quadrature signal Q3 is associated with velocity signal dB̅, and quadrature signal Q4 is associated with velocity signal dA. If these quadrature signals were used to select a portion of their respective velocity signals to be combined to form a continuous output velocity signal, there would appear the rise time components in each of the four quadrants. This is shown as waveform *y* in FIG. 8. Such a condition is undesirable in that it will tend to give false indications of the velocity being measured.

To solve this problem, comparison signals C1–C4 are used to modify the quadrature signals Q1–Q4 such that a new set of switching signals S1–S4 are generated. Switching signals S1–S4 will gate each of the four velocity signals and will only allow switching from one velocity signal to the next velocity signal when those two velocity signals are equal or the velocity signal being switched to is greater than the velocity signal being switched from. The generation of switching signals S1, S2, S3 and S4 are generated by AND circuits 60, 61, 62 and 63. The switching signals S1–S4 are shown as waveforms *q–t* respectively of FIG. 8. If one compares S1 with Q1, it can be seen that the leading edge of the quadrature signal has now been delayed until velocity signal dB became equal to or greater than velocity signal dA. The trailing edge of velocity signal S1 is the same as the trailing edge of quadrature signal Q1. The same is true for the comparisons of switching signal S2 with quadrature signal Q2, switching signal S3 with quadrature signal Q3 and switching signal S4 with quadrature signal Q4. The leading edge of the switching signals is used to set latches 64–67. Latches 64–67 generate a timing ring wherein when one latch is turned on, it will turn off the latch that precedes it in time. This is to say that latch 65 will reset latch 64 when latch 65 is initially set by switching signal S2. In similar manner, S3 will cause latch 66 to be set which in turn will reset latch 65. Switching signal 64 will set latch 67 which will reset latch 66. Finally, switching signal S1 will set latch 64 which in turn will reset latch 67. The output latch signals L1–L4 are shown as waveforms u–x respectively in FIG. 8.

Now comparing the output latch signals of L1–L4 with quadrature signals Q1–Q4, it now can be seen that they are the same as the original quadrature signals Q1–Q4 but delayed in time by the amount that it takes one quadrant to reach a true velocity indication. While it is shown that each of the quadrants has associated the same amount of time delay, in practice this might not be the case and therefore, all of the latch signals L1–L4 may not in fact represent 90° of the periodic input quadrature signal. However, the summation of the latch signals L1–L4 will sum to 360° and when combined will generate an output continuous velocity signal that is the most accurate indication of the actual velocity attainable by this circuitry. The use of the comparator signals to generate the switching signals for generating the latching signals will eliminate the rise time components from each of the velocity signals. The combining of the corrected portion of the velocity signals is performed bvy using the output control signals L1–L4 to condition gates 68–71 to selectively gate in time portions of velocity signals dB, dA, $d\bar{B}$ and $d\bar{A}$. There will exist an output from one and only one of the gates at any instant of time and there will always be an output from one of the gates such that a continuous output velocity signal is generated. Attention is drawn to waveforms i–1 in FIG. 8 and specifically to the shaded area of those waveforms which indicates the selected portions of those waveforms that will be selected by latch signals L1–L3 and combined by the actuating of gates 68–71 to form the output velocity signal, shown as waveform z of FIG. 8.

In order to eliminate any DC component from existing in the velocity signal when the input velocity is zero, field effect transistor gates are used for gates 68–71. A field effect transistor gate is shown in FIG. 7.

It should be realized that the signal being passed through gate 68–71 is equal to the signal being generated across the resistor in the differentiators 42–45 and that there is no electronic circuitry in-between that resistor and the output velocity which can introduce any DC component into the output signal. Since one of the latches 64–67 must be set at any given instant of time, if the input velocity should reach a zero value, there will be an output conditioning one of the gates 68–71. This being the case, one of the outputs from the differentiator is being sensed as the component to the output velocity at that instant of time. It should be noted, however, that since the signal being outputted as the velocity is equal to the signal being generated across a resistor and that velocity is zero, no current will be flowing through the resistor and the output voltage will be zero volts.

Returning to FIG. 1, there is shown switches 9 and 10 which are used to control the distribution of quadrature signals A and B to the system. Switches 9 and 10 are in the position shown when grating 12 moves in one direction with respect to grating 11. When the direction of movement of grating 12 is reversed, switches 9 and 10 change their positions. The switching of signals A and B is necessary in order to keep the proper timing relationship between A and B and this relationship is a function of direction of motion of grating 12 with reference to grating 11.

In operation, the two input quadrature signals 90° out of phase with each other are generated by the interaction of optical gradients 11 and 12. The quadrature signals would be triangular in shape except for the nonlinearities which occur in the circuitry at the point of discontinuities which cause a rounding effect at these points. It is therefore desirous to use linear portions of the two quadrature signals so as to generate a continuous velocity signal. To this end, automatic gain controlled circuitry maintains the amplitude of the two quadrature signals constant such that the slope or rate of change of these signals is a true indication of the velocity. Effectively, the two quadrature signals will increase in frequency as the velocity of the moving body increases. The two quadrature signals are thereafter differentiated to generate four velocity signals where each velocity signal contains an accurate indication of the velocity being measured in its positive excursion. The input quadrature signals are also used to generate the timing for the electronic tachometer such that the tachometer timing is automatically synchronized. The relative amplitudes of the different differentiated signals are compared such that the differentiated signal that will next be selected will not be switched to until it is at least equal to or greater than the velocity that is presently being outputted as the velocity of the system being measured. This timing information is used to control FET gates so as to select that portion of the four velocity signals in the positive excursion.

In so doing, the system provides an output velocity that is highly accurate and does not contain any discontinuities or interruptions of the velocity signal due to the switching between the different components making up the final output velocity signal. Further, due to the method in which the velocity signal itself is generated, there will exist no DC component within the velocity signal when a zero velocity is measured. This is to say that when the velocity being measured is zero, the output voltage is zero.

While this invention has been particularly shown and described with reference to the preferred embodiment heretofore described, it will be understood by those skilled in the art that various changes in form and detail may be made therein without departing from the spirit and scope of the invention.

What is claimed is:

1. An electronic tachometer for generating a continuous output velocity signal comprising:
   generating means for generating two continuous and periodic quadrature signals, the slopes of each of said quadrature signals during each cycle containing the intelligence as to the value of the velocity being measured, said two quadrature signals being 90° out of phase with respect to each other;
   timing means connected to said generating means for generating a plurality of timing signals from said two quadrature signals to control the timing of the electronic tachometer;
   processing means for generating a plurality of velocity signals from said two quadrature signals and for generating a plurality of comparision signals, said comparison signals being indicative of the relative size between selected ones of said velocity signals;
   selection means connected to said timing means and said processing means for generating a plurality of selection signals from said comparison signals and timing signals; and combination means for selecting specific portions of each of said velocity signals by gating said velocity signals by said selection signals, said gated portions of said velocity signals being combined to form a continuous output velocity signal.

2. The electronic tachometer set forth in claim 1 wherein said processing means further comprises a plurality of differentiating means for generating said velocity signals from said quadrature signals.

3. The electronic tachometer of claim 2 wherein said processing means further comprises a compensating means for each differentiating means for increasing the effective rise time of each said differentiating means.

4. The electronic tachometer as set forth in claim 3 wherein said compensating means is connected to said timing means for controlling when said compensating means is to provide compensation to said differentiating means.

5. The electronic tachometer of claim 4 wherein said compensating means provides the compensation for each differentiating means by inputting selective portions of the generated velocity signals from other differentiating means to the differentiating means being compensated.

6. The electronic tachometer of claim 5 wherein said gating means in said combination means is a field effect transistor.

7. The electronic tachometer as set forth in claim 1 wherein said gating means in said combination means is a field effect transistor.

8. The electronic tachometer as set forth in claim 1 further comprising an automatic gain control circuit connected to said generating means for generating an automatic gain controlled signal from said two quadrature signals.

9. The electronic tachometer as set forth in claim 3 further comprising an automatic gain control circuit connected to said generating means for generating an automatic gain controlled signal from said two quadrature signals.

10. The electronic tachometer as set forth in claim 5 further comprising an automatic gain control circuit connected to said generating means for generating an automatic gain control signal from said two quadrature signals.

11. The electronic tachometer as set forth in claim 6 further comprising an automatic gain control circuit connected to said generating means for generating an automatic gain control signal from said two quadrature signals.

12. The electronic tachometer as set forth in claim 7 further comrpising an automatic gain control circuit connected to said generating means for generating an automatic gain control signal from said two quadrature signals.

13. An electronic tachometer for generating a continuous output velocity signal comprising:

generating means for generating two continuous and periodic quadrature signals A and B, the slope of each of said quadrature signals during each cycle containing the intelligence as to the value of the velocity being measured, said two quadrature signals being 90° out of phase with each other;

timing means connected to said generating means for receiving quadrature signals A and B and for generating from quadrature signals A and B four quadrature timing signals Q1, Q2, Q3 and Q4, each of said quadrature timing signals representing 90° of the 360° period of said quadrature signals A and B, processing means comprising:

differentiating means for generating four velocity signals dA, dĀ, dB and dB̄ from said quadrature signals A and B, comparison means for generating comparison signal C1 whenever velocity dB is equal to or greater than dA, for generating comparison signal C2 whenever dĀ is equal to or greater than dB, for generating comparison signal C3 whenever dB̄ is equal to or greater than dĀ and for generating comparison signal C4 whenever velocity signal dA is equal to or greater than velocity signal dB̄;

selection means connected to said timing means and said processing means for receiving quadrature timing signals Q1, Q2, Q3 and Q4 and comparison signals C1, C2, C3 and C4 and for generating selection signals L1, L2, L3 and L4 from said received signals, where output signal L1 is initiated upon the coincidence of quadrature timing signal Q1 and comparison signal C1 and terminates upon the occurrence of signal L2, where output signal L2 initiates upon the coincidence of quadrature timing signal Q2 and comparison signal C2 and terminates upon the occurrence of output L3, where output signal L3 initiates at the coincidence of quadrature timing signal Q3 and comparison signal C3 and terminates upon the initiation of output signal L4, and finally where output signal L4 initiates at the coincident of quadrature timing signal Q4 and comparator signal C4 and terminates upon the occurrence of output signal L1, combination means connected to said selection means for receiving output signals L1, L2, L3 and L4 for selectively gating velocity signals dB, dĀ, dB̄ and dA for form said desired output velocity signal, where output signal L1 selects the portion of velocity signal dB to be used for the output velocity signal, where output signal L2 controls the portion of velocity signal dĀ to be used in the output velocity signal, where L3 is used to select the portion of velocity signal dB̄ to be used in the output velocity signal and where output signal L4 is used to select a portion of velocity signal dA to be used in the output velocity signal, the continuous output velocity signals being the selected portions of velocity signals dB, dĀ, dB̄ and dA.

14. The electronic tachometer as set forth in claim 13 wherein the combination means employ field effect transistors whose gate is controlled by output signals L1, L2, L3 and L4 to select the portions of velocity signals dB, dĀ, dB̄ and dA to form the output velocity signal of the electronic tachometer.

15. The electronic tachometer as set forth in claim 13 wherein said timing means further generate two compensating timing signals IA and IB from said two quadrature signals A and B; and said processing means is connected to said timing means to receive two compensating timing signals, IA and IB, said compensating timing signals IA and IB condidtioning gating means for selecting specific portions of each of said velocity signals dA, dB, d$\overline{A}$ and d$\overline{B}$, said selected portions of said velocity signals dA, dB, d$\overline{A}$ and d$\overline{B}$ being connected to said differentiating means for improving the effective rise time of the generated velocity signals dA, dB, d$\overline{A}$ and d$\overline{B}$ so as to improve the effective high frequency of said differentiating means.

16. The electronic tachometer as set forth in claim 13 wherein the electronic tachometer further comprises;
   automatic gain control means connected to said generating means for receiving said quadrature signals A and B, absolute value detector and compensating means for obtaining the instantaneous absolute value of quadrature signals A and B, said absolute value and compensating means further introducing the non-linearities into the absolute value generated for quadrature signals A and B by introducing non-linearities into the absolute values for quadrature signals A and B as the absolute values of A and B approach a zero value, said non-linearities introduced being equal to the non-linearities existing in the absolute values generated for each quadrature signal A and B about each peak value of absolute value A and B such that the absolute value signals A and B when added together would produce a signal equal to a constant;
   summation means for adding the absolute values generated by absolute value detector and compensator for quadrature input signals A and B and for substracting that summation from a reference voltage to produce an automatic gain control error signal which is used to sense variations in the amplitude of the generated quadrature signals A and B from a designed specified value.

17. The electronic tachometer as set forth in claim 14 wherein the electronic tachometer further comprises:
   automatic gain control means connected to said generating means for receiving said quadrature signals A and B, amplitude value detector and compensating means for obtaining the instantaneous absolute value of quadrature signals A and B, said absolute value and compensating means further introducing the non-linearities into the absolute value generated for quadrature signals A and B by introducing non-linearities into the absolute values for quadrature singals A and B as the absolute values of A and B approach a zero value, said non-linearities introduced being equal to the non-linearities existing in the absolute values generated for each quadrature signal A and B about each peak value of absolute value A and B such that the absolute value signals A and B when added together would produce a signal equal to a constant;
   summation means for adding the absolute values generated by absolute value detector and compensator for quadrature input signals A and B and for substracting that summation from a reference voltage to produce an automatic gain control error signal which is used to sense variations in the amplitude of the generated quadrature signals A and B from a designed specified value.

* * * * *